(12) United States Patent
Steyn (10) Patent No.: US 9,243,189 B2
(45) Date of Patent: Jan. 26, 2016

(54) CONVERSION OF NATURAL GAS (75) Inventor: Rian Steyn, Kempton Park (ZA)

(73) Assignee: ASA Energy Conversions Ltd., Road Town, Tortola (VG)

( * ) Notice: Subject to any disclaimer, the term of this patent is extended or adjusted under 35 U.S.C. 154(b) by 122 days.

(21) Appl. No.: 13/882,249

(22) PCT Filed: Oct. 31, 2011

(86) PCT No.: PCT/GB2011/001544
§ 371 (c)(1),
(2), (4) Date: Jul. 16, 2013

(87) PCT Pub. No.: WO2012/056203
PCT Pub. Date: May 3, 2012

(65) Prior Publication Data
US 2013/0289144 A1 Oct. 31, 2013

(30) Foreign Application Priority Data
Oct. 29, 2010 (GB) .................................. 1018338.2

(51) Int. Cl.
*C10G 2/00* (2006.01)
*C10G 45/00* (2006.01)
(Continued)

(52) U.S. Cl.
CPC ................ *C10G 2/341* (2013.01); *B01D 3/009* (2013.01); *B01J 19/30* (2013.01); *B01J 19/32* (2013.01); *C10G 2/32* (2013.01); *C10G 2/332* (2013.01); *C10G 45/00* (2013.01); *B01J 2219/30203* (2013.01); *B01J 2219/30215* (2013.01); *B01J 2219/3221* (2013.01); *B01J 2219/32466* (2013.01); *C10G 2300/1022* (2013.01); *C10G 2300/1025* (2013.01); *C10G 2300/4087* (2013.01); *C10G 2400/02* (2013.01); *C10G 2400/04* (2013.01); *C10G 2400/08* (2013.01); *C10G 2400/20* (2013.01); *C10G 2400/22* (2013.01); *C10G 2400/26* (2013.01); *C10G 2400/30* (2013.01)

(58) Field of Classification Search
CPC ........... C10G 2/341; C10G 2/34; B01D 3/009
See application file for complete search history.

(56) References Cited

U.S. PATENT DOCUMENTS 3,464,679 A * 9/1969 Becker ........................ 261/114.1
4,295,936 A * 10/1981 Farnham ........................ 202/153
(Continued)

FOREIGN PATENT DOCUMENTS

WO 0110979 A1 2/2001
WO 0136066 A2 5/2001
(Continued)

OTHER PUBLICATIONS

Foreign communication from the priority application—International Search Report and Written Opinion, PCT/GB2011/001544 dated Aug. 17, 2012, 8 pages.
(Continued)

*Primary Examiner* — Lessanework Seifu
(74) *Attorney, Agent, or Firm* — Conley Rose, P.C.; Rodney B. Carroll (57) ABSTRACT

A process and apparatus for converting a mixture of hydrogen and carbon monoxide to hydrocarbons comprising reacting the hydrogen and carbon monoxide at elevated temperature and pressure in contact with a suitable catalyst in a reactive distillation column is disclosed.

6 Claims, 4 Drawing Sheets

(51) Int. Cl.
*B01J 19/30* (2006.01)
*B01J 19/32* (2006.01)
*B01D 3/00* (2006.01)

(56) References Cited

U.S. PATENT DOCUMENTS

| | | | |
|---|---|---|---|
| 4,673,464 A * | 6/1987 | Zeitsch | 202/158 |
| 5,326,436 A * | 7/1994 | Sampath et al. | 203/98 |
| 5,496,446 A * | 3/1996 | Yeoman et al. | 202/158 |
| 5,855,741 A | 1/1999 | Koch et al. | |
| 5,886,055 A | 3/1999 | Nemphos et al. | |
| 6,265,452 B1 | 7/2001 | Steynberg et al. | |
| 6,486,220 B1 | 11/2002 | Wright | |
| 6,590,001 B2 | 7/2003 | Trinh et al. | |
| 6,608,001 B2 | 8/2003 | Allison | |
| 6,720,358 B2 | 4/2004 | Espinoza et al. | |
| 6,723,886 B2 | 4/2004 | Allison et al. | |
| 6,730,708 B2 | 5/2004 | Raje et al. | |
| 6,764,662 B2 | 7/2004 | Chen et al. | |
| 6,809,122 B2 | 10/2004 | Zhang et al. | |
| 6,869,978 B2 | 3/2005 | Wright et al. | |
| 6,878,655 B2 | 4/2005 | Raje et al. | |
| 6,923,922 B2 | 8/2005 | Chen et al. | |
| 6,949,488 B2 | 9/2005 | Belt et al. | |
| 6,956,063 B2 | 10/2005 | Zhang et al. | |
| 6,962,947 B2 | 11/2005 | Wright et al. | |
| 6,974,843 B2 | 12/2005 | Straguzzi et al. | |
| 7,001,927 B2 | 2/2006 | Zhang et al. | |
| 7,001,928 B2 | 2/2006 | Raje | |
| 7,012,103 B2 | 3/2006 | Espinoza et al. | |
| 7,022,741 B2 | 4/2006 | Jiang et al. | |
| 7,033,569 B2 | 4/2006 | Stickney et al. | |
| 7,041,621 B2 | 5/2006 | Ramani et al. | |
| 7,067,562 B2 | 6/2006 | Espinoza et al. | |
| 7,078,439 B2 | 7/2006 | Odueyungbo et al. | |
| 7,115,669 B2 | 10/2006 | Zhang et al. | |
| 7,226,548 B2 | 6/2007 | Xie et al. | |
| 7,276,540 B2 | 10/2007 | Espinoza et al. | |
| 7,888,278 B2 | 2/2011 | Rapier et al. | |
| 7,985,777 B2 | 7/2011 | Stickney et al. | |
| 8,410,018 B2 | 4/2013 | Steiner et al. | |
| 8,461,219 B2 | 6/2013 | Steiner et al. | |
| 8,614,164 B2 | 12/2013 | Steiner et al. | |
| 8,618,016 B2 | 12/2013 | Steiner et al. | |
| 2002/0037937 A1 | 3/2002 | Raje et al. | |
| 2002/0086910 A1 | 7/2002 | Trinh et al. | |
| 2002/0111262 A1 | 8/2002 | Allison | |
| 2002/0177741 A1 | 11/2002 | Allison et al. | |
| 2002/0198096 A1 | 12/2002 | Wright et al. | |
| 2002/0198429 A1 | 12/2002 | Ramani et al. | |
| 2003/0008929 A1 | 1/2003 | Allison | |
| 2003/0012711 A1 | 1/2003 | Harkins et al. | |
| 2003/0027875 A1 | 2/2003 | Zhang et al. | |
| 2003/0083535 A1 | 5/2003 | Wright et al. | |
| 2003/0125396 A1 | 7/2003 | Espinoza et al. | |
| 2003/0125397 A1 | 7/2003 | Zhang et al. | |
| 2003/0134913 A1 | 7/2003 | Zhang et al. | |
| 2003/0149121 A1 | 8/2003 | Zhang et al. | |
| 2003/0236440 A1 | 12/2003 | Chen et al. | |
| 2004/0059008 A1 | 3/2004 | Raje et al. | |
| 2004/0059009 A1 | 3/2004 | Belt et al. | |
| 2004/0122115 A1 | 6/2004 | Espinoza et al. | |
| 2004/0127585 A1 | 7/2004 | Raje | |
| 2004/0132832 A1 | 7/2004 | Espinoza et al. | |
| 2004/0138060 A1 | 7/2004 | Rapier et al. | |
| 2004/0138317 A1 | 7/2004 | Xie et al. | |
| 2004/0140245 A1 | 7/2004 | Ramani et al. | |
| 2004/0166055 A1 | 8/2004 | Stickney et al. | |
| 2004/0171702 A1 | 9/2004 | Odueyungbo et al. | |
| 2004/0192987 A1 | 9/2004 | Jiang et al. | |
| 2004/0192989 A1 | 9/2004 | Espinoza et al. | |
| 2004/0198844 A1 | 10/2004 | Straguzzi et al. | |
| 2004/0202607 A1 | 10/2004 | Chen et al. | |
| 2004/0204508 A1 | 10/2004 | Zhang et al. | |
| 2005/0124706 A1 | 6/2005 | Wright et al. | |
| 2005/0261383 A1 | 11/2005 | Xie et al. | |
| 2005/0265920 A1 | 12/2005 | Ercan et al. | |
| 2009/0005464 A1 | 1/2009 | Hoffer et al. | |
| 2009/0182064 A1 | 7/2009 | Griffin | |
| 2010/0113625 A1 | 5/2010 | Stickney et al. | |
| 2011/0112203 A1 | 5/2011 | Steiner et al. | |
| 2011/0112204 A1 | 5/2011 | Steiner et al. | |
| 2011/0112205 A1 | 5/2011 | Steiner et al. | |
| 2011/0118365 A1 | 5/2011 | Steiner et al. | |

FOREIGN PATENT DOCUMENTS

| | | |
|---|---|---|
| WO | 2008052992 A1 | 5/2008 |
| WO | 2012056203 A2 | 5/2012 |
| WO | 2012056203 A3 | 5/2012 |

OTHER PUBLICATIONS

Foreign communication from the priority application—International Preliminary Report on Patentability, PCT/GB2011/001544 dated Apr. 30, 2013, 6 pages.

Foreign communication from a related counterpart application—United Kingdom Search Report, GB 1018338.2, Feb. 11, 2011, 4 pages.

Srinivas, S., et al., "Feasibility of Reactive Distillation for Fischer-Tropsch Synthesis;" Ind. Eng. Chem. Res., 2008, vol. 47, pp. 889-899, American Chemical Society.

Srinivas, S., et al., "Feasibility of Reactive Distillation for Fischer-Tropsch Synthesis 2;" Ind. Eng. Chem. Res., 2009, vol. 48, pp. 4710-4718, American Chemical Society.

Srinivas, S., et al., "Feasibility of Reactive Distillation for Fischer-Tropsch Synthesis 3;" Ind. Eng. Chem. Res., 2009, vol. 48, pp. 4719-4730, American Chemical Society.

Srinivas, S., et al., "Reactive Distillation for Fischer-Tropsch Synthesis: Feasible Solution Space;" Ind. Eng. Chem. Res., 2010, vol. 49, pp. 6350-6361, American Chemical Society.

Srinivas, S., et al., "Reactive Distillation for Fischer-Tropsch Synthesis: Simulation-Based Design Methodology Using Aspen Plus;" Ind. Eng. Chem. Res., 2010, vol. 49, pp. 9673-9692, American Chemical Society.

Foreign communication dated Aug. 19, 2014 from a related European Patent Application No. 11785757.3 filed Oct. 31, 2011 (4 pages).

* cited by examiner

CONVERSION OF NATURAL GAS

CROSS-REFERENCE TO RELATED APPLICATIONS

This application is a filing under 35 U.S.C. 371 of International Application No. PCT/GB2011/001544 filed Oct. 31, 2011, entitled "Conversion of Natural Gas," which claims priority to United Kingdom Patent Application No. 1018338.2 filed on Oct. 29, 2010, which applications are incorporated by reference herein in their entirety.

FIELD OF THE INVENTION

Several processes exist to convert NG (natural gas) to liquids. Most of these processes are based on catalytic Fischer-Tropsch reactions to convert reformed synthesis gas to petroleum liquids. Some non Fischer-Tropsch processes exist that convert NG to liquids by cracking and hydro-treating methane to ethylene. These have process reactor configurations using fixed bed, moving bed, fluidised bed or slurry phase reactors. These processes also use fractionation units in a refinery configuration separate to the reactor unit. The invention relates to an improved reactor design configuration that allows for improved reaction rates and fractionation plant separation efficiency. This leads to improved economies of scale and allows for a more compact and cost effective overall plant design.

BACKGROUND OF THE INVENTION

Process for the conversion of NG to petroleum liquids are generally referred to as "Gas To Liquids" (GTL) processes. The overall conversion process involves a number of individual processing steps that are specific to the technology employed. The specific steps also depend on the feed stock used and the intermediate reaction products or processing pathway selected.

The processing steps generally follow the following sequence:

a. Feed stock supply processes—For conventional GTL plants, NG is directly extracted from a producing natural gas field via a number of production wells. The natural gas could, however, be supplied from compressed natural gas (CNG) sources or liquefied natural gas (LNG) storage tanks that involve re-vaporisation.

b. Feed stock conditioning processes—When the feed is directly from the well head, the NG has to be water and hydrocarbon dew point controlled, as well as treated for any acid gases present. With CNG and LNG feed stocks, the NG is already conditioned prior to compression and therefore further conditioning is not required.

c. Reforming processes—A large number of reforming process routes are available. Steam reforming, partial oxidation reforming and auto-thermal reforming are all variants of the same basic processing sequence to convert methane, $CH_4$ (NG is typically 85% to 99% methane), to synthesis gas consisting of carbon monoxide, CO, and hydrogen $H_2$. Synthesis gas could have a different carbon to hydrogen ratio depending on the conversion process used. The carbon to hydrogen ratio is important in terms of further downstream hydrocarbon chain growth reactions.

d. Ethylene cracking process—With the conversion of NG to liquids via the acetylene/ethylene route, a reforming process is not used to form carbon chain growth precursors or reactants. In this process methane, $CH_4$, is cracked in the absence of oxygen under high temperature to acetylene, $C_2H_2$, which is hydro-treated with hydrogen to ethylene, $C_2H_4$. Ethylene is a multifunctional molecule containing the reactivity to facilitate carbon number chain growth under controlled conditions.

e. Synthesis gas conditioning—The synthesis gas is conditioned with any recycled gas to be a pure synthesis gas by removal of excess carbon dioxide, $CO_2$ and nitrogen, $N_2$, where necessary.

f. Hydrogen purification processes—Recycled gases containing a bulk composition of predominantly hydrogen, $H_2$, have to be cleaned with a hydrogen concentration of at least 90 vol % before it can be blended in with synthesis gas as reactor feed gas. Hydrogen units are typically membrane or pressure swing absorption units, depending on the technology employed.

g. Air separation processes—This step depends on the reforming process used and whether pure oxygen is required in the reforming technology. Air separation processes applicable to GTL processing is therefore in general oxygen production plants used for reforming reagents. This is usually a proprietary pressure swing absorption, membrane or cryogenic separation process.

h. Main reaction processes—The heart of the GTL process is the conversion of conditioned reactor feed gas ($C_1$ (CO) or $C_2$) to longer chain length hydrocarbon products mostly in the $C_4$ to $C_{20}$ carbon number range. The most common processing route is via the catalysed Fischer-Tropsch process where the carbon number split is a function of the process temperature and pressure used, as well as the type of reactor and the catalyst (Iron versus Cobalt). With the ethylene reaction route, a basic hydrocarbon chain growth catalyst or acid zeolite is used, which is similar in function to the Fischer-Tropsch catalyst. The reaction mechanism is, however, different as oxygen is not present in the process molecules, i.e. the oxygen in the feed gas from the Reformer (as Carbon Monoxide, CO) is only applicable to Fischer-Tropsch reactions. With ethylene processing, only hydrocarbons are present and water does not form as a reaction product. Consequently this has some treatment plant benefits. Present state-of-the-art reactor designs have the catalyst in a fixed bed, moving bed, fluidised bed or slurry phase configuration.

i. Reaction products from the main reactor contain a mixture of carbon based compounds that have to be refined to commercial product specifications. This includes gasoline and diesel based products, as well as liquefied petroleum gas (LPG), kerosenes, aviation fuels, light end olefins and heavier waxes and cracker type feed products. These products are separated in a refinery using of a number of fractionation columns to separate predominantly on boiling point difference and distillation cut points.

j. Steam and electricity generation processes—Although all light end waste gas could be flared, it is typically used as an energy source to drive a boiler system or an electrical power generation unit.

k. Utility processes—Electricity or Steam co-generated by the use of waste gas is produced as a plant or complex wide utility for energy optimization. Light end waste gas could also be supplied as utility fuel gas for use in a number of burner units around the complex. Nitrogen separated from the Air separation process is supplied as a utility for safety inerting and blanketing purposes around the complex.

DESCRIPTION OF THE PRIOR ART

The conventional process developed by Franz Fischer and Hans Tropsch was first used in Germany and patented in the USA in 1926. The catalyst was iron based and used in a fixed bed reactor. The Fisher-Tropsch process was used for production of petroleum liquids from synthesis gas derived from gasified coal. This coal-to-liquids (CTL) technology to convert coal to automotive fuels was commercially used in South Africa in the 1950's.

A further two Fischer-Tropsch based CTL refinery complexes were built in South Africa. Both these complexes used an improved reactor design based on moving bed technology. These reactors were called Synthol reactors.

The Synthol reactors were changed out to Advanced Synthol reactors using fluidised bed technology in the late 1990's.

It was then realised that this Fisher-Tropsch technology could be used to convert reformed NG to liquids. A complex was built by the South African government in the late 1980's in Mossel Bay, South Africa, to convert NG to liquids based on a Synthol reactor system. This complex is currently owned by PetroSA.

In 2005 Qatar Petroleum Corporation (QPC) built a GTL plant in a joint venture called ORYX GTL at the Ras Laffan complex in, Qatar. The reactor configuration used is a slurry phase reactor that uses an improved fourth generation Slurry Phase Distillate process.

Shell and others have recently developed similar technologies to the basic Fischer-Tropsch GTL processes and are commercialising it with QPC in the Pearl GTL joint venture, also in Ras Laffan. This will be the world's largest GTL venture and is based on Shell Fixed Bed technology.

The Fischer-Tropsch reaction is exothermic in the forward direction during the conversion of synthesis gas, CO/H2, to final liquid products. Significant heat is released by the catalysed reaction and has to be removed by a process heat sink in the Fischer-Tropsch reactor.

The following heat removal designs have been used in Fischer-Tropsch reactors:

a) Fixed bed tubular reactors (these were the first generation of processes) have a fixed catalyst bed within tubes of the reactor. The construction of the reactor is similar to a shell and tube heat exchanger and molten salt or water is used in the shell side of the reactors to dissipate the heat generated in the tubes. An inert catalyst could also be inserted in sections of the catalyst packing in the tube to facilitate a dilution effect and prevent reaction hot spots. Accurate design modelling is required to properly design the packed section within each tube to prevent hot spots and run-away reactions. Heat dissipated into molten salt or directly by steam boiling is effectively converted into high pressure and temperature export steam and can be used as a common utility within the petrochemical complex. The flow configuration in a fixed bed reactor is similar to a plug flow model. The gaseous feed reactants and the formed products are typically vapour phase and move through the catalyst at a significant velocity. This leads to catalyst movement, abrasion and eventually to catalyst fines formation associated with reactivity loss. The fixed bed configuration gives a hydrocarbon product predominantly in the wax range, requiring back cracking of waxes to gasoline and diesel range automotive products.

b) Moving bed reactors (these were the second generation of processes) are characterised by large 180° overheads bends on top of the reactors to facilitate gas or vapour phase flow of reaction products and catalyst. This is considerably turbulent and leads to a significant improvement in reaction kinetics compared with fixed bed configurations. The catalyst fines formation is accelerated and a harder, more robust, catalyst is required. A further drawback is that the entrained catalyst is erosive and thinning of the overheads bend sections compromise plant integrity. Heat removal is in a quench zone after the catalyst is separated from the vapour stream in a cyclone bank similar to a fluid catalytic cracker cyclone bank. The catalyst is recycled to the main reactors and the quenched liquid products separated for work-up. Quenching water is converted to steam and exported as a complex utility source.

c) Fluidised bed reactors (these were the third generation of processes) use the feed gas flow to provide pressure drop for catalyst particles to become in a fluidised or suspended state. Heat removal tubing is installed within the reactor that boils water to facilitate heat dissipation and stabilisation of the reactor temperature. Liquid and vapour phase products are extracted and worked up into petroleum products. Boiled water is exported as steam to the complex. Reaction products are typically in the light and middle distillates range and do not require back cracking to provide automotive fuels. The fluidised bed catalyst is kept in suspension by means of upward drag entrainment in balance with gravity. This phenomenon is well known to persons skilled in the art. The catalyst is continuously moving in a fluidised state and therefore prone to catalyst fines generation and abrasion. Fines have an increased surface to volume ratio and lift out of the fluid bed. This leads to lowered catalyst activity in the bed. Catalysts can be either iron or cobalt based depending on the reaction temperatures and pressures selected.

d) The current state-of-the-art commercial process (the fourth generation of processes) employed in the latest Oryx GTL plant uses a slurry phase reactor where the gaseous feed reagents are bubbled through a liquid phase reaction bed that has the Fisher-Tropsch catalyst suspended to form a slurry. The heat is removed in heat exchange tubes and steam is generated from water. The slurry phase process is predominantly a middle distillates process focused on diesel production. The reactor temperatures, pressures and cobalt catalyst favour carbon numbers in the diesel fuel range. Again, slurry phase catalyst particles are in a constant mixed turbulence of the liquid slurry, and fines are generated. Although less of a concern than moving or fluid bed reactors, there is still an activity loss.

WO 01/36066 discloses an apparatus and method for producing hydrocarbons according to the Fischer-Tropsch process. The apparatus comprises a catalytic distillation reactor where reactants are fed into the catalytic distillation reactor to undergo catalytic reaction to form hydrocarbons. In particular, the packing of pelleted catalyst in a structured wire mesh packing material is described, which packing provides for a low separation efficiency. Lower separation efficiencies lead to lower conversions rates from gas to liquid product, since water is not removed from the reaction media in an efficient manner, the presence of water in the reaction media drives the equilibrium of the reaction to favour the starting material (i.e. synthesis gas) instead of product (i.e. hydrocarbons).

More particularly, the presence of such "teabag"-type packing of catalyst provides for poor distillation. Vapour channelling and "hot-spot" control (i.e. localised regions of excessive temperature) is difficult. As a result, operating parameters are not easily tightly controlled within the distillation versus reactive sections due to poor distillation.

U.S. Pat. No. 6,265,452 discloses a process for producing liquid and gaseous products from gaseous reactants, where a horizontal reboiling reaction vessel is directly coupled with a distillation column connected to the reboiler vapour space. The vapour product formed in the reboiling reaction vessel is boiled up into the distillation column. No distillation takes place within the reaction vessel (other than liquid boiling equilibrium in a single stage). This configuration is similar to that of a conventional slurry phase reactor where vapour products are continuously boiled off and away from the reaction medium in a single equilibrium stage. The reaction and distillation takes place in two separate vessels, meaning multistage separation within the catalyst zone is not possible, leading to an overall lower conversion and separation efficiency.

SUMMARY OF THE INVENTION

We have found a way to significantly improve the GTL process in comparison with previous processes, including the fourth generation slurry phase processes. The invention uses a catalytic distillation column to facilitate the Fischer-Tropsch reaction. This reaction method may utilise a conventional Fischer-Tropsch catalyst in packed sections within the distillation column to facilitate simultaneous reaction kinetics and distillation product work up. Continuous removal of reaction products, specifically water from the reaction zone by means of distillation separation, forces the reaction in the forward direction with significantly improved kinetics. The fractionation of products within the catalyst zones also simplifies further product work up. The fractionation steps and hydrotreating catalyst (noble metal—i.e. a metal resistant to corrosion and oxidation, such as platinum, gold, palladium, silver, osmium, rhodium, ruthenium and iridium—on alumina substrate) within sections of the packed beds facilitate further product work-up and treatment to specification.

In a first aspect, the present invention provides a process for converting a mixture of hydrogen and carbon monoxide to hydrocarbons.

In a second aspect the present invention provides a process.

In a third aspect, the present invention provides a reactive distillation column.

Further features of the invention are discussed below.

BRIEF DESCRIPTION OF THE DRAWING

Reference is now made to the accompanying drawings, in which.

DETAILED DESCRIPTION

Figure 1:
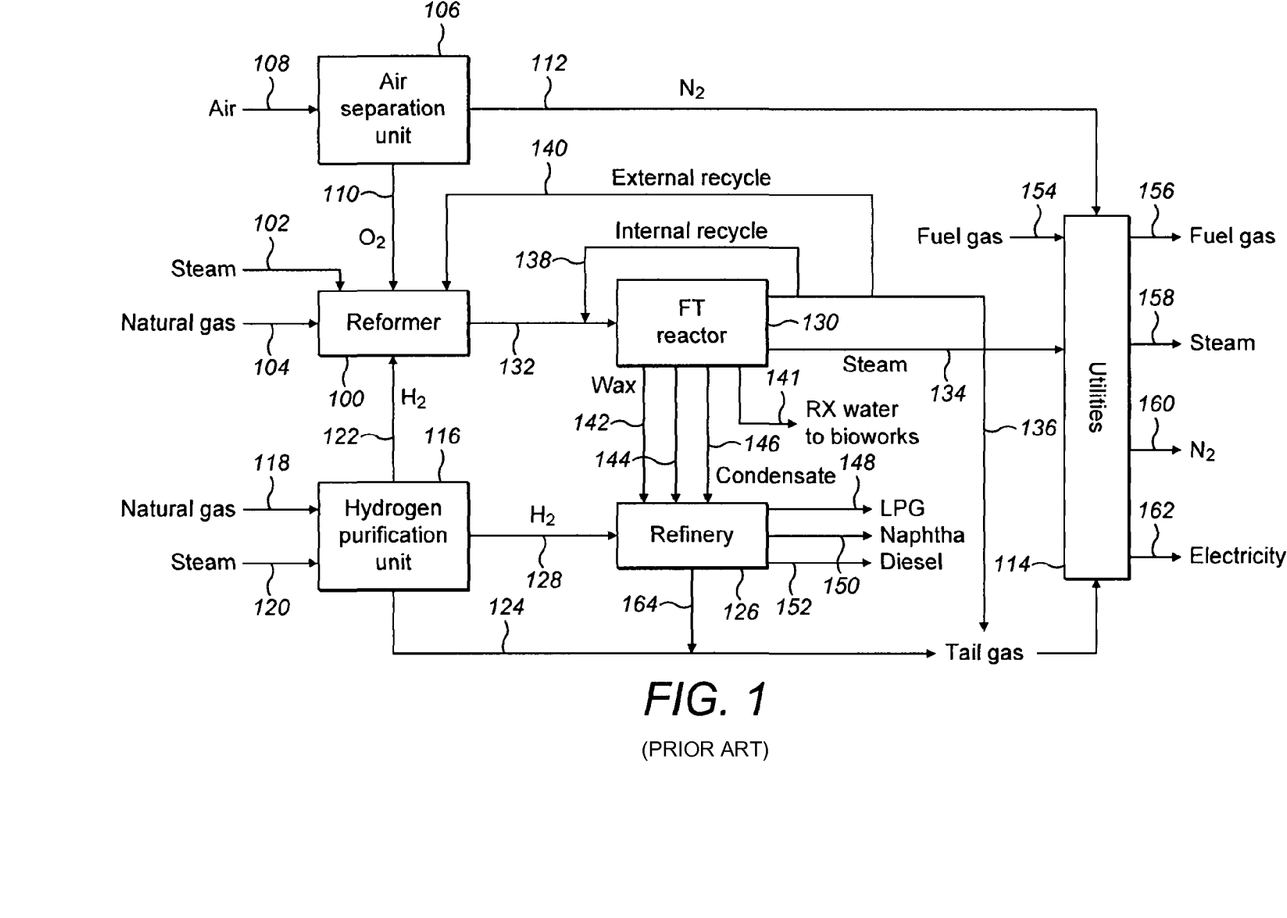
FIG. 1 is a schematic diagram of a process and apparatus according to the prior art.

Referring to FIG. 1 a prior art process and apparatus is shown.

Natural gas and steam are fed to a reformer 100, via streams 102 and 104 respectively. Air is fed to an air separation unit 106 via stream 108, where it is separated into an oxygen rich stream 110 and a nitrogen rich stream 112. The nitrogen rich stream 112 is fed to the plant utilities, which are generally designated 114.

Natural gas and steam are also fed to a hydrogen purification unit 116, via streams 118 and 120 respectively. The unit 116 outputs hydrogen via stream 122, which is fed to the reformer 100. The unit 116 also outputs tail gas via stream 124, which is fed to the utilities 114. These streams typically contain a mixture of hydrogen and light hydrocarbons that makes up a low to medium calorific value fuel gas that can be used to as utility gas around the complex.

Part of the hydrogen outputted from the hydrogen purification unit may be fed to a refinery 126 via stream 128. The refinery 126 is essentially a distillation column, and will be described in more detail below.

The output from the reformer 100 is synthesis gas. This is fed to a Fischer-Tropsch reactor 130 via a stream 132.

The Fischer-Tropsch reactor 130 may be a high temperature Fischer-Tropsch reactor or a low temperature one.

The high temperature reactor is used mainly to produce gasoline and olefins using an iron catalyst (or a cobalt catalyst in special applications). The reaction temperature is typically 300-350° C. and the pressure is typically 2000-3000 kPa.

The low temperature reactor is used mainly to produce waxes and diesel using a cobalt catalyst (although slurry reactors may use cobalt or iron). The reaction temperature is typically 200-250° C. and the pressure is typically 2000-3000 kPa.

The catalysts used in the Fischer-Tropsch process are well known to those skilled in the art. Cobalt based catalysts may be, for example, cobalt oxide, a Co—$ThO_2$/Kieselguhr catalyst, a Co-$AlO_2$ catalyst promoted with Ru and basic oxides. In this specification the expression "cobalt catalyst" or "cobalt-based catalyst" means any cobalt containing catalyst useful in the Fischer-Tropsch process. Iron based catalysts may be iron oxide. In this specification "iron catalyst" or "iron-based catalyst" means any iron containing catalyst useful in the Fischer Tropsch process. Other catalysts which may be used include nickel or nickel based catalysts and ruthenium or ruthenium based catalysts. Hydro-treating catalysts and zeolite catalysts may be used in some circumstances.

The following table shows a typical product distribution, which might be obtained from each reactor type.

| | Low Temperature Reactor | High Temperature Reactor |
|---|---|---|
| Methane | 3 | 6 |
| Light Olefins | 5 | 28 |
| Fuels (gasoline/diesel) | 32 | 60 |
| Waxes | 55 | 0 |
| Oxygenates | 5 | 6 |
| Main products | Waxes and diesel | Gasolines and olefins |

The reactor 130 has a number of output streams:
stream 134, which contains steam and is fed to the utilities 114.
stream 136, which contains tail gas and is fed to the utilities 114. A recycle 138 may be provided, which is fed to the reactor 130; in addition, or alternatively, a recycle 140 may be provided, which is fed by to the reformer 100.
stream 141 contains FT Reaction water which may be fed to a bio treatment plant
stream 142 contains waxes and is fed to the refinery 126.
stream 144 contains light olefins and $C_5$ to $C_9$ hydrocarbons that typically contains the bulk of the automotive fuel components and is fed to the refinery 126.
stream 146 contains condensate and light hydrocarbons in the $C_3$ to $C_6$ range and is fed to the refinery
stream 164 contains tail gas that consists of typically $C_1$ to $C_3$ hydrocarbons used as fuel gas and is fed to the utilities 114.

As discussed above, the refinery 126 essentially a series of distillation columns, which is used to separate the reaction products into desired fractions. It will be appreciated that the fractions obtained will depend on whether the high temperature or low temperature Fischer Tropsch reaction has been used, and also on the fractions which it is desired to separate. However, typical product streams from the refinery 126 comprise an LPG stream 148, a naptha/gasoline stream 150 and a diesel stream 152.

Finally, fuel gas is fed to the utilities 114 via stream 154. The utilities 114 output various utilities needed by the plant, including fuel gas (stream 156), steam (stream 158), nitrogen (stream 160) and electricity (line 162).

Figure 2:
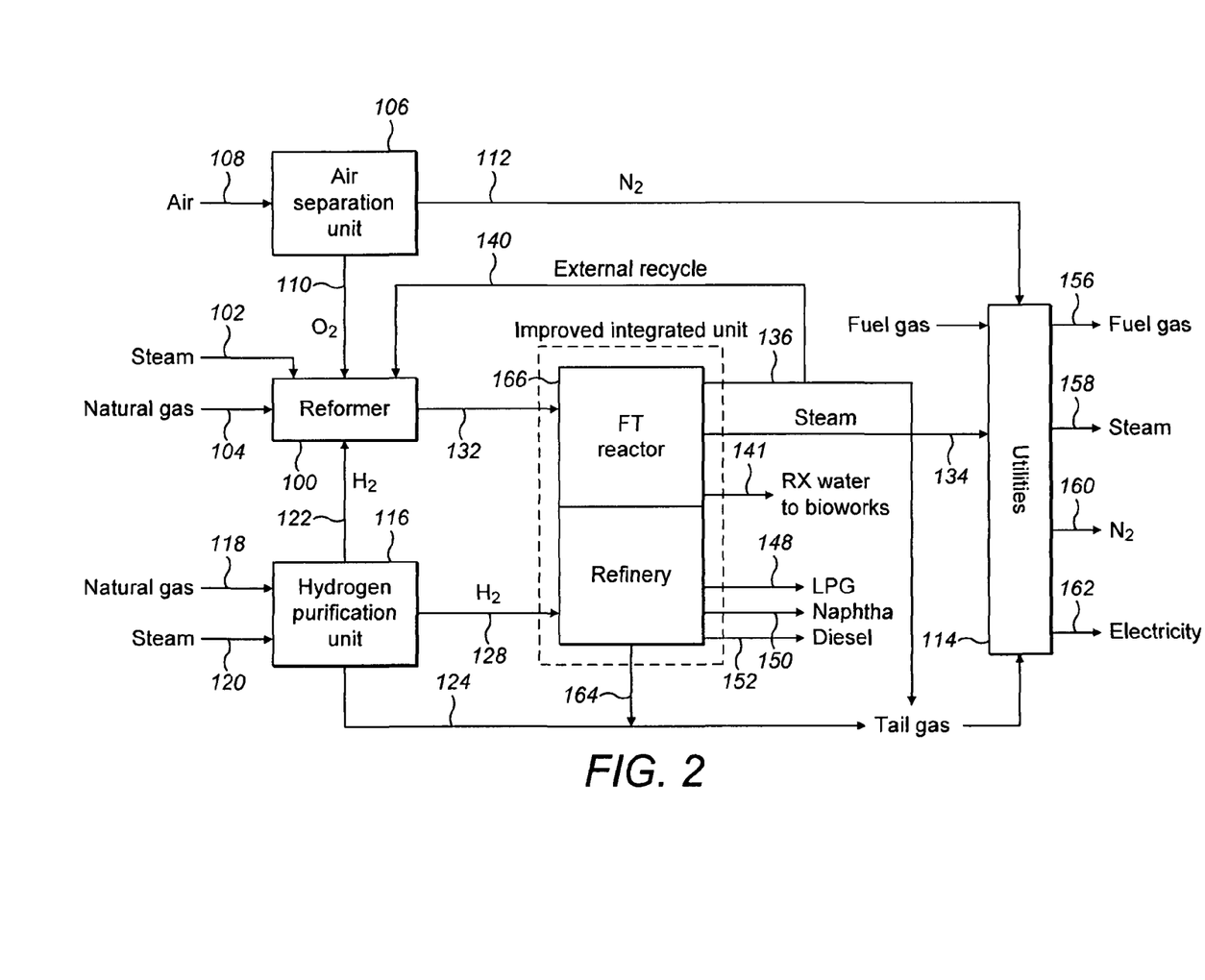
FIG. 2 is a schematic diagram of an embodiment of a process and apparatus according to the present invention.

Referring to FIG. 2, a process and apparatus according to the invention is shown. Many of the components of the apparatus shown in FIG. 2 may be the same as those shown in FIG. 1, and like parts have been designated with like reference numerals.

An important difference between the apparatus according to the invention and that according to the prior art is that the invention provides a refinery and Fischer-Tropsch reactor which are combined into a single unit 166.

Figure 3:
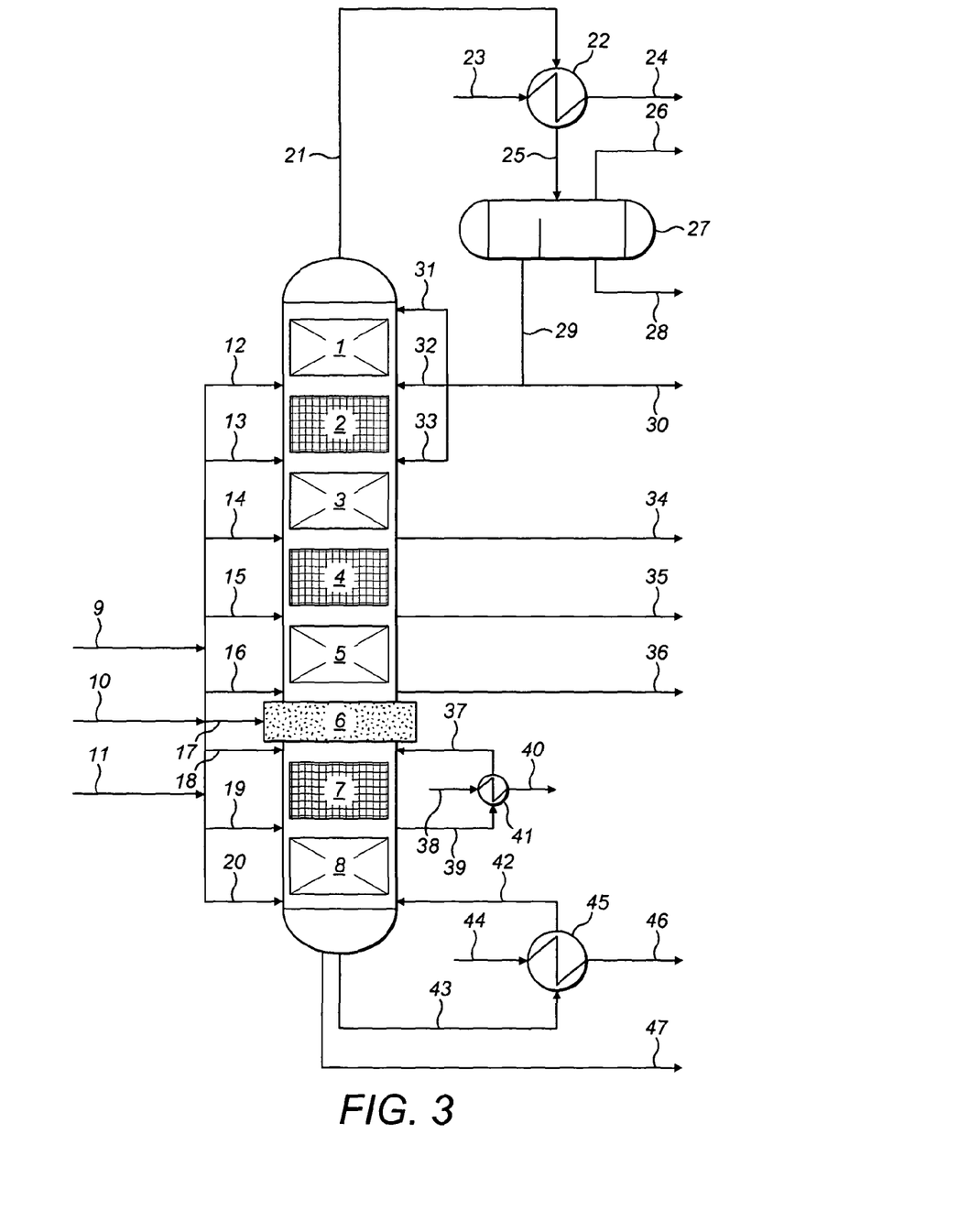
FIG. 3 is a schematic diagram of an embodiment of a reactive distillation column for use in a process and apparatus according to the present invention.

FIG. 3, shows the apparatus 166 in greater detail. Feed from separate or combined streams 9, 10 and 11 enter the GTL reactive distillation column. The streams 9, 10, and 11 may be combined, or kept separate, and/or further feed streams may be included, to provide streams 12, 13, 14, 15, 16, 17, 18, 19 and 20. Streams 9 to 20 may correspond to streams 132 and 128 of FIG. 2.

Any product may leave from streams 30, 34, 35 and 36, as discussed below; these streams may correspond to 134, 136, 148, 150 and 152, in no specific order, of FIG. 2.

Stream 26, discussed below, may be used to recycle gas and light end products, and may correspond to the external recycle stream 140 and/or stream 164 of FIG. 2. Stream 28, discussed below, corresponds to stream 141 of FIG. 2.

This feed can be a range of liquid or gas phase feeds as described in the preferred embodiments below.

These feed streams can be combined to feed as separate or mixed feed and to enter any number of the feed entry location points identified by reference numerals 12 to 20. The selection of feed composition and individual feed location is based on determination of targeted carbon number range within the fractionation or reactive sections.

Feed stream 17 is the main GTL reactive distillation column feed as it enter the combustion and rapid quench chamber 6.

The combustion and quench chamber 6 facilitates rapid heating and cooling of gas, where the gas can be heated to temperatures in the range of 250° C. to 1600° C. The rapid quenching by liquid down flux from the reactive distillation column traffic rapidly cools the cracked gas to a temperature of 250° C. to 350° C. The heating of the combustion chamber can be switched off in the case of gaseous feeds other than methane containing gas, where cracking is not required.

Non methane feed gas is predominantly fed through feed streams 17, 19 and/or 20 depending on the catalytic zone configuration and the carbon range selected. Reagent gas is lighter than boiled up process vapour within the reactive column and will rise to the top of the column as it remains mostly in non-condensable gaseous state. The partial pressure of the reagent gas compounds therefore depletes to the top of the reactive distillation column as the gas is consumed by the GTL reactions.

Process streams 12 to 16 are used when the partial pressure of reagent gas is lower than required to facilitate high reaction rates that determine product carbon range and carbon number split control.

Figure 4:
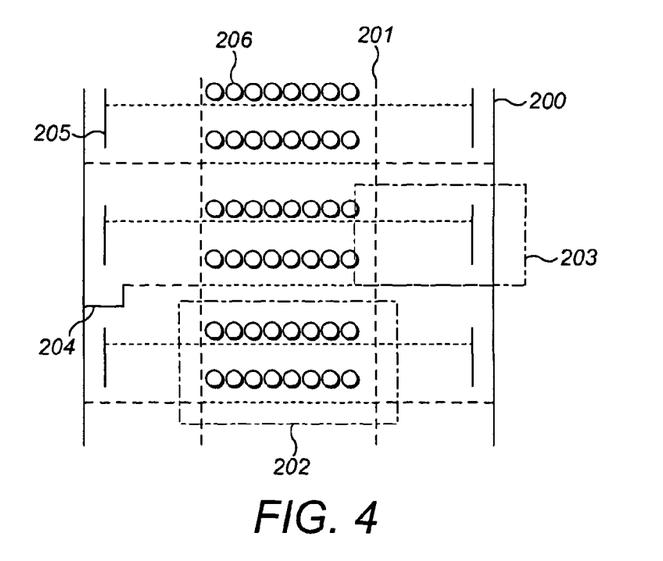
FIG. 4 is a schematic of an embodiment of a reactive distillation column of the present invention.

Referring to FIG. 4, the column 200 comprises a distillation zone comprises catalytic zone 202 and a non-catalyst zone 203. The non-catalyst zone 203 is required for improved overall distillation separation to facilitate cut-point fractionation to required distillate cut point specifications within the same reactive tower. The catalyst free zone area 203 and vapour channel diameter are designed to facilitate specific heat removal and heat of reaction control in combination with reflux ratio adjustment.

The combined reaction and distillation zone enables Fischer Tropsch reaction simultaneously with conventional distillation facilitated by sieve or valve trays. The heterogeneous catalyst 206 is packed within the perforated vapour channel loading tube 201 that facilitates the required vapour/liquid equilibrium contact with the catalyst for reaction. The tray configuration is a multi-pass disk and doughnut distillation tray type that allows for both liquid and vapour contact of the catalysts within the correct reaction zone. This hardware and true reactive distillation capability is not possible with any of the other processing configurations selected in the prior art.

This above configuration is unique and allows for side draws and pump around between catalyst zones by use of a trap-out tray 204 on a doughnut tray section.

The tray configuration and processing methodology allows for typical vapour liquid equilibrium contact per tray with adjustable downcomer clearance 205 and weir height to balance pressure drops required in the catalyst zone. Without proper pressure balance vapour channelling and liquid maldistribution will be problematic and lead to inferior reaction rates and poor distillation.

Sections 1, 3, 5 and 8 of the reactive distillation column are fractionation sections used for separation of reaction products and purification of final products selected. These sections can be single or multiple packed, or trayed sections. The section numbers are used for illustrative purposes and can be used within the column in any design configuration in relation to the packed catalyst sections. These sections are also not limited to four sections per column as indicated for illustration purposes only. For example, 1, 2, 3, 5, 6, 8, or more such sections may be used instead.

Sections 2, 4, and 7 are sections containing catalyst packing in a specific tray/packing configuration. The catalysts used within each of the sections could vary depending on the reaction products selected. These catalytic reaction sections are also not limited to three sections per column as indicated for illustration purposes only. For example, 1, 2, or 4 such sections may be used instead.

Provision of distinct reaction zones and distillation zones adjacent to each other ensures simultaneous reaction and distillation. Providing the distillation zones adjacent to the reactions zones allows for an efficient separation of the products of the reactions (i.e. water and hydrocarbon). Continuous and efficient removal of water from the reaction zones drives the equilibrium of the reaction to favour further product (i.e. water and hydrocarbon) instead of product (i.e. synthesis gas).

The reaction zones comprise catalyst. The distillation zones are free of, or substantially free of, catalyst. The distillation zone provides for separation of the fluid mixture in the column. By removal of liquid from the column from any one of the distillation zones in the column, fractions of particular cut-points specifications can be withdrawn; removal of liquid from different reactions zones of the same reactive column will provide distillate having different cut point specifications.

In a particularly preferred embodiment, the column comprises a vapour channel. In an embodiment, vapour passes upwards through the voids in the catalyst tube as well as on the outer tray space through the bottom upwards through the holes in the sieve or valve type trays. This bubbling of vapour below to the liquid on the tray causes the main vapour/liquid contact/equilibrium for distillation.

The vapour channel is preferably perforated. The vapour channel is preferably cylindrical, although other shapes are possible, and runs along the vertical length, or substantially along the vertical length, of the column, i.e. the axis of the column. The column may comprise trays which are located horizontally within the column. The column preferably comprises a plurality of such trays, for instance, 3, 4, 5, 6, 7, 8, 9, 10, 11 or 12 (or more). The plurality of trays may intersect the vapour channel. Where the plurality of trays intersect the vapour channel, the section of the tray inside the vapour channel may be permeable to fluid; in an embodiment, the section may comprise a wire mesh or sieve. This allows vapour to rise from one tray section to another through the mesh/sieve. Each of the plurality of the trays may comprise a weir at the intersection between the tray and the vapour channel. The height of the weir determines how much liquid is retained on a particular tray. Any excess liquid will flow over the weir, and into the vapour channel.

The weir height may be adjusted, as required. The weir height depends on how much resident liquid is required on a particular tray—the more liquid is required (and thus the higher the liquid height), the higher the weir height. The liquid height is the static height of fluid that any vapour must pass through to get to the vapour space of the tray and eventually to the top of the column. The higher the liquid height, the greater the differential pressure is required by the vapour to bubble and push through the liquid. Therefore, by adjusting the weir height, an operator may set the liquid height of a particular tray, thereby facilitating flow of fluid from the catalyst tube outwards, whilst facilitating the correct flow of vapour through the valves of trays, as well as the through the catalyst tube upwards.

The adjustable down corner clearance is determined by the weir height. The weir height is adjustable by manually setting the heights with the bolting adjustments to a pre-calculated height that will allow the desired liquid height on the trays. The liquid height is the static height of fluid that the vapour must pass through to get to the vapour space of the tray and eventually to the top of the column. The higher the liquid height, the more the differential pressure required by the vapour to bubble and push through the liquid, thereby allowing for the balancing of pressure drops. By adjusting the weir height, the liquid level is set to force the flow from the catalyst tube outwards whilst facilitating the correct flow of vapour through the sieve/valve tray holes on the open tray area as well as the through the catalyst tube upwards.

In operation, the liquid on a particular tray is fed with further liquid flowing down from a tray above. This downflow is initiated by liquid fed from the reflux condenser flowing onto the top tray, which liquid flows progressively to lower trays. The liquid on a particular tray may overflow into the vapour channel tube. Any liquid overflow may then flow out at the slots provided at the bottom of the vapour channel tube. Some liquid may flow through the valves provided on the trays.

Each of the sections of the plurality of the trays inside the vapour channel may be packed with catalyst (although some of the sections may not be packed with catalyst, if desired). The wire mesh of sieve retains the catalyst in place in the vapour channel, but at the same time allows vapour within the column to rise. This configuration is particularly advantageous since it allows for an optimal contact between the catalyst and reactants.

Each of the plurality of trays in the areas outside of the vapour channel may have valves which allows for vapour to rise from beneath each tray. In operation, liquid will be present on the tray. Thus vapour rising from beneath the tray and through the valves is then bubbled through the liquid resident on the tray. This configuration is particularly useful since it maximises liquid/vapour contact, thereby optimising distillation efficiency.

In a preferred embodiment, the column comprises multi-pass disk and doughnut distillation trays. The liquid on the tray is fed from the downflow of liquid from the tray above. This downflow starts at the reflux condenser flowing onto the top tray. The liquid on the top tray overflow into the centre catalyst tube and flow out at the slots in the bottom of the tube. There may be some minimal weeping through of liquid through the sieve/valve tray holes. The liquid then flows to the outer overflow weir from the doughnut tray and downwards onto the disc tray where it flow towards the central catalyst tube again to the next tray lower down, repeating the process.

Thus, for any particular tray in the column, the liquid retained on that tray is fed by additional liquid flowing down from a tray above it. This downflow starts as liquid returned from the reflux condenser (i.e. condensed from vapour extracted from the overheads stream) and fed into the top or near the top of the column. Any excess liquid on any given tray may then overflow into the centre catalyst tube, and subsequently flow out at the slots in the bottom of the tube. Some liquid may flow out through the sieve/valves on the tray; however, this may not be the main route for liquid to flow down the column. The liquid then slows into a donut tray. Any excess fluid may then flows from the donut tray over the outer overflow weir down to a disc tray. Any excess liquid in the disc tray may then flow towards the central catalyst tube, thereby flowing down progressively to lower trays.

The column of the present invention may further allow for an improved removal of heat from the column in the following manner. Liquid from the condenser that is cooled (such as stream 29 of FIG. 3) may be refluxed back into the column (for instance, at points 31, 32 or 33), which liquid may then flow from the top tray downwards in the column. The refluxed liquid may also overflow over one or more of the weirs of the vapour channel, thereby flowing downwards in the vapour channel. This configuration is particularly advantageous since it may provide for an improved contact between liquid and vapour; in particular, it may provide for a counterflow between the downwards flow of liquid, and upwards rise of vapour. Further advantages of the configuration include ensuring the catalyst is wetted at all times, and that any heat of reaction produced by the catalyst is constantly removed by liquid downflow. The transfer of the heat of reaction to the liquid down flow may also result in the boiling of the liquid; as the liquid flows over the catalyst, the heat produced at the catalyst may be absorbed at a temperature which may be constant at any given tray in the column. A particularly advantageous feature of this invention is that, in the event that excessive amounts of heat are removed from a particular tray leading to a temperature lower than the boiling of liquid for that particular tray, the liquid will absorb the heat of vaporization (from any vapour rising from beneath that tray), allowing the liquid to boil. In this way, the column improves the vapour/liquid contact equilibrium. Further, the exposure of the catalyst to liquid and vapour flow aids in cleaning and activation of the catalyst.

Thus the vapour channel and distillation zone (i.e. free of catalyst) facilitate heat removal in two ways: (1) Liquid from the condenser that is cooled is refluxed back into the column and facilitates liquid traffic from the top tray downwards in the column. The refluxed liquid however overflows over the central catalyst weir tube from the top and flows downwards in the catalyst tube. This allows for counterflow contacting between downflow of liquid and upflow of vapour as well as wetting the catalyst. The heat of reaction is therefore absorbed by the liquid downflow. (2) The second mechanism is that heat is further absorbed by boiling of the contacting downflow of liquid. As the liquid flows over the catalyst heat is absorbed at constant tray temperature and should the heat absorbed be more than required for liquid boiling, the liquid will phase change absorbing the heat of vaporization and a portion of it will boil. This adds further vapour liquid contact equilibrium and aids in the cleaning and activation of the catalyst. Due to this heat removal phenomenon the heat of reaction is removed by the larger reflux condenser, whilst the reboiler is typically smaller than required as the reaction heat assist in boiling liquid and keeping the column in vapour/liquid equilibrium.

Thus, according to the present invention, most of the heat of reaction generated during the conversion of reactants to products is used to boil liquid and facilitate the proper vapour/liquid equilibrium for distillation of the fluid, meaning less external heat is required. This may allow for a small reboiler. Any excess heat may be removed using the reflux condenser.

In a preferred embodiment, the catalyst is packed within the doughnut central tube in sections as mixed with inert balls to facilitate the correct reaction rate and heat dissipation rate. The bottom of the tube is equipped with a mesh sieve that retains the catalyst from falling through the tray holes.

The catalyst may be packed in the column in any manner known in the art. For instance, such packing includes (i) random packing that may use specific prefabricated patterns like ring shapes, such as "Raschig" rings or "Pall" rings, or saddle shapes, such as "Intallox" saddles or (ii) structured packing, such as catalyst that is prefabricated into structures such as corrugated sheets or gauze of catalyst, which may then be packed in a pattern into the catalytic zone. Alternatively, the granules or particular of catalyst may be packed into wire or gauze "socks" or envelopes, which are then packed into the catalytic zone.

In any given tray, the catalyst, which may be packed within the vapour channel, may be mixed together with inert material, for instance in the shape of balls, beads or other regular or irregular shapes, in order to control the reaction rate and/or heat dissipation rate.

In an alternative embodiment, homogenous liquid phase catalysis may be used. In an embodiment, a suitable catalyst for use in homogenous liquid acid catalysis is PTSA (p-toluene sulfonic acid).

The liquid phase catalyst may be dissolved in the liquid phase of the reaction mixture, and thus the liquid catalyst also forms part of the liquid stream that traffics down the distillation column during operation of the column.

However, the homogeneous liquid catalyst itself influences the characteristics of the liquid in the column (such as its boiling temperature) and other physical properties (such as surface tension, viscosity and density) of the liquid. Thus homogenous liquid catalysts are arguably not "true" catalysts, since they affect the properties of the reaction which they catalyse (in direct contrast with heterogeneous catalyst that leaves the liquid mixture properties unchanged). Thus, in an embodiment, homogenous liquid phase catalysis may be specifically excluded for use with the present invention, for instance, where it is desired to not affect the properties of the liquid in the column.

If homogeneous liquid phase catalysis is used, the sections 2, 4 and 7 could be replaced with trayed or packed sections to facilitate additional fractionation. In this case boiling point of the homogeneous catalyst will be higher than the light boiling product at the top of the reactive column and the catalyst may be fed in stream 12. Spent catalyst is neutralised as part of the treatment to bottoms product stream 47.

Overheads vapour exits the reactive distillation column in stream 21 and enters the overheads condenser 22. This condenser condenses the overheads gas to liquids with non-condensable gases remaining in gaseous state and leaving through stream 25.

Stream 26 contains light end products, non-condensable gases like inert Nitrogen, Carbon Dioxide and unreacted Carbon Monoxide. Stream 26 is further processed through number of processing steps to extract LPG, feed stock olefins, fuel gas and unreacted CO for recycle.

The condensed liquid stream with dissolved light ends and gases leaves the condenser under gravity two phase flow, via stream 25, into the reflux drum, 27.

Demineralised cooling water, heat transfer fluid like Dowtherm, boiler feed water or similar cooling medium may be used in stream 23 as coolant to condense the hot process vapours. This cooling medium can be heated or vaporised directly or indirectly to form export steam in the pressure range of 100 kPag to 6000 kPag depending on process conditions selected.

The reflux drum 27 is equipped with a weir plate to facilitate continuous separation of immiscible water and hydrocarbon liquid phases. This vessel can be equipped with a coalescing pad to improve liquid phase separation efficiency. Water is transferred to a water treatment plant for work-up, re-use or disposal depending on the production facility, via stream 28.

A portion of the hydrocarbon phase, stream 29, is recycled back to the reactive distillation column as reflux. The reflux can be recycled back into the column at single or multiple feed points above, within or below any of the fractionation or packed sections within the reactive distillation column. The top three streams 31 to 33 are shown for illustrative purposes only.

The remaining portion of stream 29 leaves as stream 30, which contains a light hydrocarbon product in the light naphtha or gasoline range. Minimal further work-up is required in the downstream refining section. This product could be automotive gasoline with an octane number range of 83 to 98 RON and is predominantly in the C5 to C8 carbon number range. This carbon number range and the specific products extracted are however dependent on the operating parameters of the reactive column and the catalyst specifications.

Single or multiple side draws can be withdrawn from any of the sections within the reactive distillation column and serve as a method of both carbon range and split control. The side draw streams 34 to 36 are shown for illustrative purposes only.

The bulk of the hydrocarbon products are withdrawn as side streams and contain the white oil middle distillates in the $C_6$ to $C_9$ hydrocarbon range and the gasoils predominantly in the $C_7$ to $C_{10}$ range. This is predominantly diesel and aviation fuel range products requiring further product work-up in the down-stream refining sections. Typically these products are automotive grade diesel with an ultra low sulphur content of <100 ppm. It could be extracted as any one of the following products as raw cut or final product specification depending on the column and side stripper configurations, as well as the operating and catalyst parameters:

Illuminating Kerosene—This may be in provided in a final product specification, and may be used for domestic illumination. Illuminating kerosene is also known in the art as household paraffin, paraffin oil or lamp oil.

Power Kerosine—This is a similar grade of paraffin to illuminating kerosene, but may have a slightly higher combustion value. Power kerosene may commonly used in domestic appliances or farming equipment to drive engines.

Jet A1 specification aviation fuels—This is aircraft fuel and may be provided in a final product specification.

Marine grade diesels and/or diesel bunkers—These fuels may include higher sulphur marine diesel grade for ship engines. These fuels may also further comprise heavier hydrocarbons than found usually in normal diesel, which hydrocarbons are closer to the wax range.

Medium and heavy naphtha—Typically, these are not final products. but intermediate blending products used on a refinery for blending with other products or intermediates to obtain certain final products having specific fuel properties.

Light Fuel Oils—The are usually used industrially for driving boilers, burner system and power generation units, and may also be used to drive ship engines.

Stream 39 is a pump around stream that can be used to pump reacted liquid around a reaction section for increased reaction conversion or predominantly heat removal or heating. The outlet stream 37 can therefore be at a higher or lower temperature or different vapourisation state than the inlet stream 39 and will adjust the reaction zone liquid and vapour traffic accordingly to facilitate carbon number control and heat balance control around the reaction zone.

The present invention may accommodate more than one pump-around stream 39, and these streams may be positioned at different sections of the reactive distillation column. The pump-around stream (which may be also defined as a side draw circuit) is particularly useful for controlling temperature of specific sections of the reactive distillation column. By providing additional heating or cooling in a specific catalyst section or packed bed, the present invention allows an operator control the kinetics of a reaction in a specific zone different from another zone, in order to facilitate specific carbon number growth. Previous reactors designs did not allow an operator such specific control.

Streams 38 and 40 could be boiler feed water, cooling water, heat transfer fluid or steam depending on the heat removal/addition methodology selected. The pump around heat exchanger, 41, facilitates direct or indirect steam production as export steam in the pressure range of 100 kPag to 6000 kPag. When in heating mode, condensate will be formed in stream 40 that is recycled as boiler feed water. A pump around stream may be provided for any of the sections 1-8 of the column.

Bottoms fluid exits the reactive distillation column via streams 43 and 47.

Stream 47 is transferred to the refinery section for further treatment and typically contains heavy bottoms products like fuel oil, waxes and tars.

Stream 43 is used for reboiling and vapour generation, via stream 42, to drive the distillation process in the reboilers, 45. The reboiler is typically a furnace type reboiler with fuel gas entering as stream 44 and flue gas exiting as stream 46 to atmosphere. The fuel gas for stream 44 could be sourced from light end fuel exiting with stream 26.

The following improvements on state-of-the-art process are applicable:

Catalyst packed in a gauze wire bag is less prone to turbulent mixing and less fines are generated due to decreased abrasion. As such, providing any catalyst in the reactive distillation chamber in a fixed and/or packed bed has a number of advantages, since it may prevent accelerated catalyst abrasion and/or fines generation.

Reaction rates are increased due to removal of equilibrium limiting reaction product from the reaction zone by means of distillation. The Fischer Tropsch reaction results in the of hydrocarbon and water, and thus the presence of water may negatively affect reaction rates, since water is a equilibrium limiting product. With all prior art designs of reactor designs, water product stays in the reaction mixture and thus influences reaction kinetic negatively. In other words, with prior designs, the formation and subsequent of water slows the reaction since the water remains in the reaction/product mix. On the other hand, with present designs, water is removed from the reactive distillation column as condensed liquid, and/or it is removed from the column by distillation. Removal of water pushes the equilibrium to favour to more product, and thus has a very significant effect on the reaction rate by facilitating faster reactions than achievable using conventional designs.

The present invention allows for precise control over the GTL reactions that occur in the reactive distillation column. In particular, a variety of feed types may be introduced at a variety of positions into the column though a plurality of feed inlets. Therefore, if a particular zone of the reactive distillation column has hydrocarbon product therein having a particular carbon number or carbon number range, then further hydrocarbon can be injected into that zone to influence the product formed. For instance, if a lower carbon number hydrocarbon is injected into a section having a higher carbon number hydrocarbon, the reaction will then be shifted to favour formation of a product having a carbon number intermediary of the two hydrocarbons. Such control over the carbon number of the hydrocarbon product formed was not possible with previous reactor designs, since feed enters at one end of the reactor, and the product leaves at the other end; as the mixture of feed and product progresses through previous reactor designs, carbon chains of the product keep growing, and no precise control over the carbon chain length is possible.

In accordance with the present invention, in principle, feed may enter a catalyst zone from three routes. These are: (1) as vapour boiled up from a distillation zone below the catalytic zone in question; (2) liquid refluxing down from a distillation zone above catalytic zone in question; and (3) fresh feed injected directly into the catalyst zone via the one or more feed inlets. The carbon number range of (1) and (2) depend on the particular set of reactions occurring in the reactive distillation column below and above, respectively, the catalytic zone in question. However, the carbon number of the feed (3) can be determined by an operator, and may be less than, the same as, or greater than, the carbon number of the product present in a catalyst zone.

For instance, a catalyst zone operating at around 300° C. may have $C_8$ hydrocarbon refluxing from above, and $C_{10}$ being boiled up from below. In accordance with the present invention, the feed input can comprise hydrocarbon having any carbon number. For instance, $C_4$ hydrocarbons may be injected into the catalyst zone, if desired, and this will lower and/or dilute the carbon number range of the product in the catalyst zone in question, and thus enable control over the eventual final product carbon number.

The operating line L/V principle is well understood by person skilled in the art of distillation. The reflux ratio and liquid down flux is generally adjusted in the fractionation column to increase separation efficiency. In the invention this serves as internal recycle mechanism and aids in the control of carbon number. Increased reflux recycle reagents to the reaction zone and facilitate increased carbon number.

In accordance with the present invention, the reflux ratio may be adjusted in any one or more of the three ways:

(1) By adjusting the cooling medium duty into the condenser, for instance, by adjusting the cooling water flow through the exchanger;

(2) By adjusting the flow rate of the process hydrocarbon stream the condenser has to condense, for instance, by by-pass flow control or partial condensation;

(3) By adjusting the ratio of reflux to distillate, for instance, when a total condenser is used (i.e. which condenses all of the vapour); the ratio of product withdrawn (i.e. as overheads distillate) may be adjusted in relation the amount refluxed.

As the column fractionates whilst reacting, heavier compounds formed drop out of the reaction zone to the higher temperature boiling zones below the specific reaction zone in the column. Section by section temperature control provides an effective means of carbon number control not possible in the random carbon number mix of any one of the generation one to four Fisher Tropsch reactor designs used.

The exothermic heat of the reaction is removed by boiling of the fluids in the reaction zone. No heat transfer tubes or quenching liquids are required as the latent heat of vaporisation required for boiling effectively dissipates the heat of reaction. Similarly the reflux from the partial overheads condenser is used to remove the net heat in a conventional fractionation column design configuration. Heat transfer fluids are used for steam generation and export steam.

This is an improvement over the previous and known reactor designs, since with these previous designs, the heat generated by the reaction must be removed with heat transfer tubes or similar devices. Use of any heat generated by the exothermic reaction provide a number of benefits, including removing the need to provide heat transfer/removal apparatuses, and providing efficiency gains for the present invention by removing the need to separately heat fluid in the reactive distillation chamber to drive the distillation/separation process.

Overall process heating requirements are optimized as the heat of reaction is used in situ in the reaction zone to boil-up and fractionate liquids that would have required steam reboilers and/or furnace type reboilers in the conventional refinery sections.

Increased fluid contact between gaseous/vapour phase reagents and liquid phase intermediates (intermediate carbon numbers) is facilitated by means of increased fractionation surface area due to catalyst and fractionation packing within the catalyst zone. This leads to improved mass transfer of reagents into catalyst and product out of the catalyst. Catalyst mass transfer limitations are thereby removed and reaction kinetics significantly increased.

In accordance with the present invention, heat generated by the reactions in the column may be removed, for instance, in order to control the temperatures the rates to reaction, and/or the carbon number of the product of the reaction in the column. This heat may be used to drive other processes, or may be used to generate steam (which itself may be used to drive other processes). There are a variety of means to remove the heat generated in the column. For instance, the overheads condenser may be provided on the overheads stream to cool the fluids therein. The heat removed by the overheads condenser may be used to generate steam directly (by transferring the heat to water), or indirectly, for instance, by transferring the heat to a heat transfer medium which itself then may be used to heat water. Alternatively, heat may be removed from the column using the side draw circuits; when the side draw circuits comprising means to remove heat, such as a heat exchanger, heat may be removed from the column by transferring it to water to produce steam, or indirectly via a heat transfer medium.

The overall contact time between reagent and intermediates is significantly improved as the overall residence time within the reactive column is increased compared to the generation one to four reactor designs.

The top section and the bottom section of the column can be operated at different temperatures as facilitated by fractionation temperature profile. This allows for different catalyst types to be used in the different temperature sections of the distillation column. This is the only reactor design suitable for effective carbon number control by use of different catalyst zones within the same reaction vessel that accommodate simultaneous Iron and Cobalt based catalyst installation. This leads to accurate control of carbon number splits not possible in other reactor designs. It also allows for adjusting the carbon number splits by simple adjustment of process operating parameters like temperature and pressure.

The temperature of the various sections of the column may be controlled using a number of steps, in any combination, including: adjusting a flow rate and/or temperature of the side draw circuit; adjusting the temperature and/or flow rate of the feed into the column; adjusting the temperature, reflux ratio and/or flow rate of the reflux; and/or adjusting the boiling rate of bottoms fluids and/or the vapour temperature thereof. Adjusting temperature in the reactive distillation column provides an effective means to control the carbon number of hydrocarbon product formed.

Furthermore, the use of side draws to withdraw specific fractions provides two advantages not previously possible with the known reactor designs. In particular, withdrawing fractions having a certain carbon number (or carbon number range) provides a means to obtain hydrocarbon product in a state that requires little or no further processing, purification or distillation, and thus can eliminate the need for intensive processing steps afterwards. In addition, withdrawing a particular fraction from the column prevents further reaction of that fraction, and thus provides an effective means to prevent formation of hydrocarbon product having a carbon number range bigger than the withdrawn fraction.

Thus the side draws may provide the opportunity to withdraw a specific product or carbon number cut in a fractionation column. In contrast, with previous reactor designs, any fluids, including the reactants, intermediates and products of the reaction, remain in the same reactor pool and hence it was not possible to prevent a carbon chain from growing longer than required. The present invention solves this problem, since an operator can prevent the hydrocarbon product chains from growing longer than required, by withdrawing them via the side draw out of the reactive distillation column before the chains grow too long. The boiling point of the tray within the column may be used as an indicator of the hydrocarbon species present on that tray. For instance, if the boiling temperature of a particular tray appears to be increasing, it may indicate that the average carbon number of the hydrocarbon species on that tray is increasing. In accordance with the present invention, the side draw flow rate can therefore be adjusted to prevent formation of heavy chains or waxes.

Similarly hydro-treating catalyst or acid based zeolite catalyst in separate catalyst sections allows for hydro-treating and ethylene conversion to higher carbon numbers within the same reaction vessel.

The present invention thus may also incorporate hydrotreating any olefinic compounds and/or unsaturated hydrocarbon compounds produced in the reactive distillation column in accordance with the present invention to produce saturated hydrocarbons or paraffins.

As used herein, the term paraffins may mean saturated or substantially saturated hydrocarbons, such as alkanes, that typically only have single carbon-carbon bonds. Further, as used herein, the term "hydrotreating" may be understood to include any reaction or process that results in the addition of hydrogen atoms to unsaturated hydrocarbons to make them saturated (or substantially saturated). For instance, olefins or unsaturated hydrocarbons comprise double and/or triple carbon-carbon bonds. Hydrotreating such olefins and unsaturated hydrocarbons results in the addition of hydrogen atoms, by breaking the double and/or triple carbon-carbon bonds, and adding hydrogen to the respective carbons.

Cracking of methane and hydrotreating olefinic/unsaturated compounds provides further efficiency gains to the present invention, since incorporating such processes into the reactive distillation chamber may provide a means to reduce the energy requirements of reforming natural gas into synthesis gas. Methane is cracked to predominantly ethylene that is further used as basic multifunctional molecule in parallel reactions within the reactive distillation column catalyst zones to facilitate building blocks for carbon atoms to add on for hydrocarbon chain growth via the FT reaction mechanisms.

The term multifunctional may be used to describe molecules comprising reactive zones or bonds, which zones or bonds facilitate further reactions. For instance, an alcohol has a —OH (hydroxyl) group. The oxygen of the —OH comprises free electron pairs, which facilitate further reactions. Similarly, olefins have double C═C bonds that comprise reactivity to facilitate formation of further chemical bonds. Multifunctional further means that there is more than one such reactive site within a molecule. For instance, an olefin may be considered as having two such sites, where each of the two carbon atoms of a C═C double bond has a reactive site. For instance, when a hydrogen molecule reacts with an olefin, it may break the double C═C bond, with each of the hydrogen atoms forming a new bond with each of the two carbon atoms. Since a saturated hydrocarbon or paraffin does not have any such reactive sites, or sites where bonds may be added, they may be termed non-functional.

Methane may be cracked in the distillation column by subjecting the methane to elevated temperatures, thereby decomposing the methane. Since methane is cracked by thermal decomposition, a catalyst is not necessary.

Methane cracking may involve Thermal decomposition into elemental carbon and hydrogen atoms, or carbon and hydrogen as their free radicals. As soon as these atoms and/or radicals are quenched, the atoms/radicals combine to directly form acetylene and/or ethylene directly; these products are excellent molecules for chain growth, due to their reactivity.

Methane may be fed into the column though an inlet that has heating means, such as heating coils, which heats the methane up to a temperature suitable for cracking. These inlets and heating means may be provided at a location external (for instance, a feed nozzle) or internal to the column. In an embodiment, the column may comprise a rapid combustion and quench chamber, that may comprise a chamber; as the hot cracked methane gas enters the chamber, or alternatively as methane gas is cracked in the chamber, liquid (such as reflux) may fall down onto the cracked gas through a distributor to quench it. Thus, cracking and quenching may be carried out in a chamber (such as the rapid combustion and quench chamber) within the column.

Inert gas may be mixed in any of the feed mixtures in any proportion, if required. Inert gas may be useful for a number of reasons, including controlling and/or reducing risks associated with fires and/or explosions. Alternatively, using such inert gas in a feed may effectively dilute it, therefore providing effective means to reducing and/or controlling reactions heats. This therefore provides a useful means for an operator to reduce the temperatures and/or rate of a reaction, if necessary. As used herein, Inert gas shall be understood to mean any gas that does not react with the other components and feeds of the reactions of the present invention, and may include gases such as Carbon dioxide and/or nitrogen.

Side draws used for product removal is well known to those skilled in the art of distillation. The use of side draws allows for product removal away from the reaction zone to prevent excess down flux recycle and the associated carbon number growth. This specific method of carbon number control by in situ fractionation and temperature control is not possible in the generation one to four reactor designs. The side draw circuit may comprise means to increase or control flow of fluid around it, such a pump.

The liquid down flux within the column is used as rapid quench zone for gaseous/vapour phase feed reagents. This quench zone effectively accommodates both reformer synthesis gas as well as acetylene from cracked methane. No modifications are required in the reactive distillation configuration to accommodate this wide range of feeds and reaction mechanisms.

Synthesis gas as feed leads to the formation of water as product from the Fischer Tropsch reaction. Water is continuously boiled up and is stripped away from the catalyst surface and catalytic reaction zone in the fractionation column. This steam stripping effectively combats coke or carbon depositing on the catalyst surface and is a significant improvement on the generation one to three reactor designs.

Similarly the liberated water is fractionated to the top of the distillation column and is condensed with hydro-carbons in the partial condenser. The reflux drum on the outlet of the condenser is a decanter type phase separation vessel that facilitates separation of hydrocarbon and aqueous liquid phases. The water phase is removed from the vessel and only the hydrocarbon phase is recycled. This is a further improvement on the current art of reactor design as continuous removal of water only from the reaction zone and internal recycle streams are not possible. The Fischer-Tropsch reaction zone is therefore also less prone to form unwanted reverse water-shift reactions.

With previous reactor designs (such as the generation 1 to 4 deigns) water formed as reaction product of the FT process remains in the reaction mixture, and thus influences reaction kinetic negatively, since the high water concentrations decrease reaction rates.

On the other, hand, removal of water from the reaction medium in the present invention (for instance, by separating water using the reflux drum and refluxing substantially only hydrocarbon) has very significant effect on the reaction rate, and facilitates much faster reaction rates compared to conventional reactor designs.

As reaction conversion rates are increased from conventional reactor designs, less unreacted products are formed in this reactor design. Less unreacted products allows for a smaller and simplified external recycle stream to be used and decrease the capacity requirements and costs of the Reformer and Hydrogen Purification units.

It will be appreciated that the invention may be modified within the scope of the claims.

The invention claimed is:

1. An apparatus for reactive distillation of a mixture of hydrogen and carbon monoxide to hydrocarbons comprising:

a column comprising at least into combined distillation and reaction zone comprising a catalyst zone and a non-catalyst zone;

the catalyst zone comprising a perforated vapour channel loading tube in the column comprising catalyst loaded within the tube; and a tray configuration that allows for both liquid and vapour contact with the catalyst within the catalyst zone, further comprising; at least one sieve tray and/or at least one valve tray, wherein the or each tray comprises a weir, wherein the weir of the or each tray has a weir height which defines a maximum liquid height a liquid retained on the or each tray, wherein said weir height is adjustable; and wherein the weir disposed between the inside and the outside of the vapour channel, configured to allow an excess of the liquid retained on the or each tray to flow over the weir and into the vapour channel loading tube.

2. The apparatus according to claim 1 comprising 2,3,4,5, 6,7,8 or more combined distillation and reaction zones.

3. The apparatus according to claim 1 wherein the perforated loading tube extends substantially along the vertical axis of the column, and is configured to allow vapour to rise up perforated loading tube, and liquid to fall down the perforated loading tube, wherein a bottom of the perforated loading tube optionally comprises a wire mesh or sieve, or wherein the apparatus further comprises a central catalyst weir tube.

4. The apparatus according to claim 1 wherein non-catalyst zone defines a space inside the column and outside of the perforated loading tube, optionally wherein the catalyst free zone and a diameter of the perforated loading tube are controllable to facilitate specific heat removal and heat of reaction control.

5. The apparatus according to claim 1 wherein the tray configuration comprises at least one disk tray and at least one donut tray, wherein the donut tray optionally comprises a trap-out tray, and/or wherein the donut tray comprises an outer overflow weir, wherein the weir of the or each tray optionally has a weir height which defines a maximum liquid height of a liquid retained on the or each tray, and wherein said weir height is adjustable.

6. The apparatus according to claim 1 further comprising means for directing vapour from the top of the column to a reflux condenser adapted to condense or partially condense the vapour directed from the top of the column, and/or a reboiler adapted to heat the fluid in the column.

* * * * *

UNITED STATES PATENT AND TRADEMARK OFFICE
CERTIFICATE OF CORRECTION

| | |
|---|---|
| PATENT NO. | : 9,243,189 B2 |
| APPLICATION NO. | : 13/882249 |
| DATED | : January 26, 2016 |
| INVENTOR(S) | : Rian Steyn |

It is certified that error appears in the above-identified patent and that said Letters Patent is hereby corrected as shown below:

In the Claims:

Claim 1, Column 19, Line 1, replace "at least into" with --at least one--.

Claim 3, Column 20, Line 1, replace "up perforated loading" with --up the perforated loading--.

Signed and Sealed this
Twenty-sixth Day of April, 2016

Michelle K. Lee
*Director of the United States Patent and Trademark Office*